(12) United States Patent
Flora et al.

(10) Patent No.: US 8,347,595 B1
(45) Date of Patent: Jan. 8, 2013

(54) DUST SUPPRESSION SYSTEM

(75) Inventors: Jonathan J Flora, Modesto, CA (US);
Douglas W Flora, Modesto, CA (US);
Adam Benedict, Modesto, CA (US)

(73) Assignee: Exact Corporation, Modesto, CA (US)

( * ) Notice: Subject to any disclaimer, the term of this patent is extended or adjusted under 35 U.S.C. 154(b) by 0 days.

(21) Appl. No.: 13/288,889

(22) Filed: Nov. 3, 2011

Related U.S. Application Data

(63) Continuation-in-part of application No. 12/625,481, filed on Dec. 29, 2009, now Pat. No. 8,056,313.

(60) Provisional application No. 61/220,893, filed on Jun. 26, 2009, provisional application No. 61/238,067, filed on Aug. 28, 2009, provisional application No. 61/278,522, filed on Oct. 6, 2009.

(51) Int. Cl.
*A01D 46/00* (2006.01)

(52) U.S. Cl. ...................................... 56/328.1; 15/340.3

(58) Field of Classification Search .................... 96/297, 96/300, 356, 277; 56/153, 157, 328.1; 15/84, 15/304.3, 340.4, 340.3
See application file for complete search history.

(56) References Cited

U.S. PATENT DOCUMENTS

| | | | | |
|---|---|---|---|---|
| 2,027,906 A * | 1/1936 | Hand | ............................... | 55/477 |
| 2,294,086 A * | 8/1942 | Hinds et al. | ...................... | 209/44 |
| 2,587,289 A * | 2/1952 | Cook | ............................... | 460/59 |
| 2,604,068 A * | 7/1952 | Dolbey | ......................... | 118/308 |
| 3,626,677 A * | 12/1971 | Sides | ........................... | 56/328.1 |
| 3,698,171 A * | 10/1972 | Hecht | .............................. | 56/331 |
| 3,713,277 A * | 1/1973 | Sackett, Sr. | ...................... | 96/277 |
| 4,068,802 A | 1/1978 | Goings | | |
| 4,289,509 A | 9/1981 | Holter | | |
| 4,290,820 A * | 9/1981 | Swisher et al. | ................... | 134/6 |
| 4,364,222 A | 12/1982 | Ramacher | | |
| 4,371,477 A | 2/1983 | Karowiec et al. | | |
| 4,380,353 A * | 4/1983 | Campbell et al. | ............... | 299/12 |
| 4,531,784 A * | 7/1985 | Karlovsky | ...................... | 299/64 |
| 4,572,741 A * | 2/1986 | Mason | .............................. | 127/2 |
| 4,642,977 A * | 2/1987 | Ramacher | .................... | 56/328.1 |
| 4,787,920 A * | 11/1988 | Richard | ......................... | 95/214 |
| 5,024,278 A * | 6/1991 | Shuknecht | ....................... | 171/17 |
| 5,113,643 A * | 5/1992 | Peterson et al. | ................ | 56/153 |
| 5,178,654 A | 1/1993 | Cowley et al. | | |
| 5,219,208 A | 6/1993 | Liao et al. | | |
| 5,253,925 A | 10/1993 | Modzik, Jr. | | |
| 5,300,131 A * | 4/1994 | Richard | .......................... | 96/297 |
| 5,361,600 A | 11/1994 | Kelley | | |

(Continued)

FOREIGN PATENT DOCUMENTS

WO WO 2006092702 9/2006

*Primary Examiner* — Arpad Fabian-Kovacs
(74) *Attorney, Agent, or Firm* — James M. Duncan, Esq.; Klein, DeNatale, Goldner, et al.

(57) ABSTRACT

A system for removing particles from an air stream includes a housing having an air stream inlet at a first end thereof and an air steam exhaust at a second end thereof. The housing defines a flow path between the air stream inlet and the air stream exhaust. At least one liquid introduction jet disposed between the air stream inlet and the air stream exhaust injects liquid droplets into the air stream. A scrubber disposed between the at least one liquid introduction jets and the air stream exhaust for removes smaller particles from the air stream.

7 Claims, 21 Drawing Sheets

U.S. PATENT DOCUMENTS

| | | | |
|---|---|---|---|
| 5,376,046 A * | 12/1994 | Shuknecht et al. | 460/99 |
| 5,415,671 A | 5/1995 | Bouchard et al. | |
| 5,421,147 A | 6/1995 | Holden et al. | |
| 5,683,476 A * | 11/1997 | Divers | 96/273 |
| 5,713,970 A | 2/1998 | Raring | |
| 5,743,043 A | 4/1998 | Habenicht et al. | |
| 5,803,955 A | 9/1998 | Raring | |
| RE35,917 E * | 10/1998 | Fischer et al. | 56/12.9 |
| 6,036,600 A | 3/2000 | Kruckman | |
| 6,312,504 B1 * | 11/2001 | Both et al. | 95/214 |
| 6,478,859 B1 | 11/2002 | Ferlin et al. | |
| 6,979,261 B1 | 12/2005 | Day et al. | |
| 7,131,254 B2 | 11/2006 | Flora et al. | |
| 7,322,177 B2 * | 1/2008 | Geraghty | 56/344 |
| 7,409,743 B2 | 8/2008 | Di Anna | |
| 7,412,817 B2 | 8/2008 | Flora et al. | |

\* cited by examiner

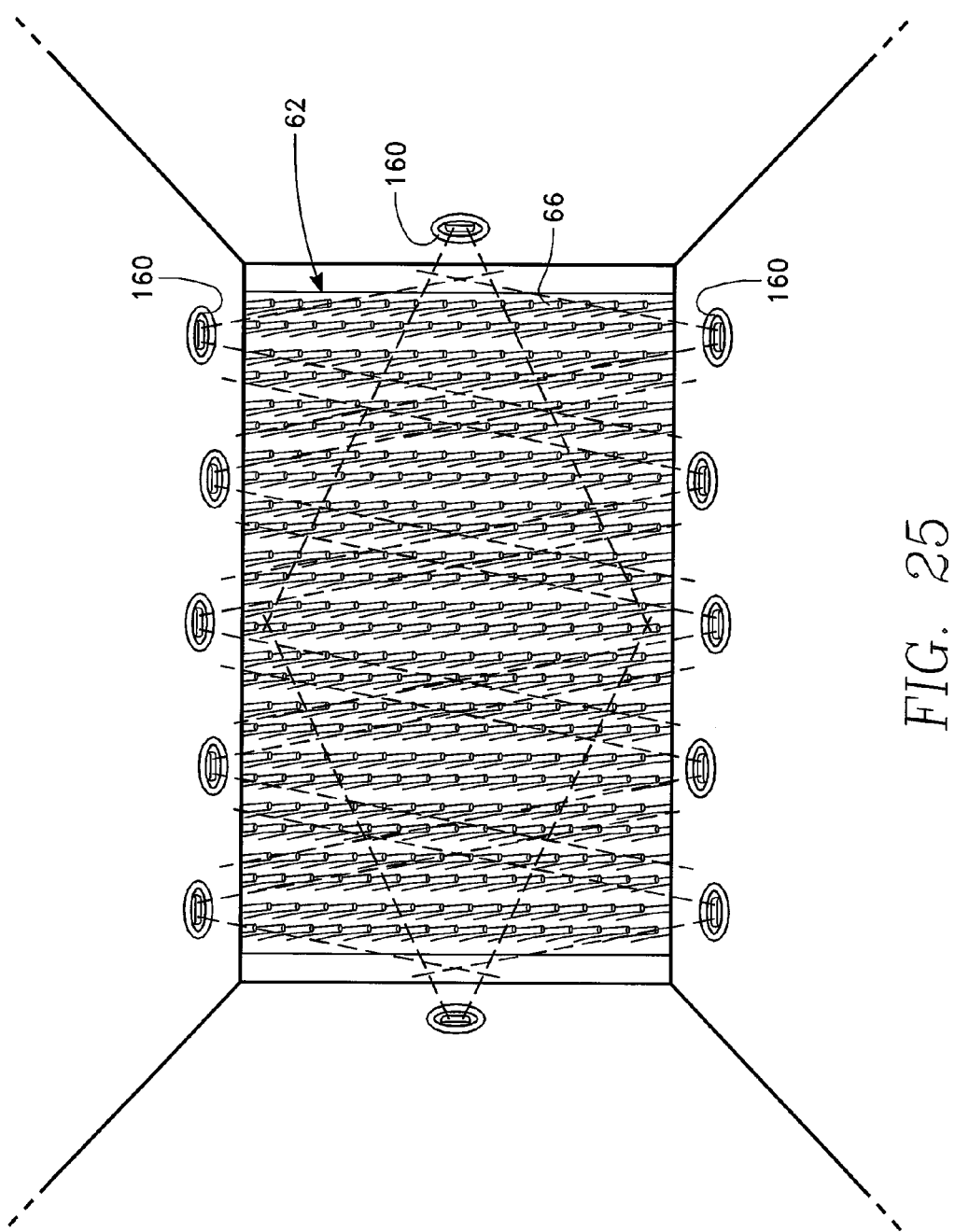

DUST SUPPRESSION SYSTEM

RELATED APPLICATIONS

The present application claims priority of U.S. patent application Ser. No. 13/243,588, filed Sep. 23, 2011, and entitled "Mobile Machinery Having a Dust Suppression System;" U.S. application Ser. No. 12/625,481, having the same title and filed on Dec. 29, 2009; U.S. Provisional Patent Application No. 61/220,893, filed on Jun. 26, 2009; U.S. Provisional Patent Application No. 61/238,067, filed on Aug. 28, 2009; and U.S. Provisional Patent Application No. 61/278,522, files on Oct. 6, 2009. These Applications are incorporated by reference herein in their entirety.

BACKGROUND OF THE INVENTION

1. Field of the Invention

The present invention relates generally to a system for controlling dust and other particulates, and more particularly to a system for removing dust and other particulate matter from an air stream.

2. Background

Dust generation by agricultural and construction machinery is a known problem, particularly in arid areas. To name just a few problems caused by the dust generation, dust particles result in air pollution, water pollution, soil loss, human and animal health problems, and potentially hazardous reductions in visibility. In addition, the dust can adversely impact the health of various plants. In an effort to reduce dust production, some air pollution control districts impose various operating limitations on farm machinery or otherwise impose different dust control measures.

Dust generation from nut and fruit harvesting equipment can be particularly problematic. These devices typically utilize high volume fans to separate nuts and/or fruit from the debris which may be picked up by the harvesting equipment, including leaves, branches, dirt clods, soil, etc. (collectively, "foreign material"). However, a large portion of the foreign material is typically blown out through the fan discharge, resulting in the dispersion of a large volume of dust into the atmosphere. An example of such a harvester is disclosed in U.S. Pat. No. 4,364,222, which is incorporated herein by this reference. In these devices, a mixture of fruit or nuts (generally referred to as "crops") and foreign material is picked up and deposited on conveyors enclosed by a housing connected to a fan inducing a vigorous flow of air through the conveyors. Various baffles, walls and guide plates direct the air so as to enhance the separation of the desirable crops from the foreign material. However, a substantial volume of foreign material is typically discharged into the atmosphere with a minimum amount of processing, thus creating a large discharge of dust.

In addition to the agricultural settings described above, dust and other particulates may be present in an air stream under a variety of circumstances. Regardless of the cause of the introduction of such particulates into the air, the hazards and disadvantages above remain present. A number of devices have been developed to remove dust and other fine particles from an air stream. Electrostatic filters, for example, use an electrical field and rely on the action of electrostatic forces to remove particles from an air stream. Such filtration devices can suffer from a non-homogeneous flow of air in proximity to the electrostatic plates and may also fail to function as well when humidity is high. Mechanical filters are also known, and while these are often effective they can result in significant head loss and are also prone to becoming clogged by particles being filtered from the air stream.

International Publication No. WO 2006/092702 A2, entitled "Cleaner for Air Polluted by Fine Dusts and Relative Purifying Process," by Cirillo et al., described a system for removing fine dust particles from an air stream. In that device, a stream of air impacts a rotating brush and the fine particles in the air adhere to the brush. The rotational speed of the brush is such that the fine particles migrate to the tips of the brush through centrifugal force and are then cast off of the brush into the housing of the device. Although Cirillo et al. provide a perforated wall through which the particles preferably pass, the rapid rotation of the brushes of Cirillo et al. necessarily result in a more or less uniform distribution of cast off particles within the device, rather than deposited the particles in a more precise location. Further, enough energy must be provided to the device of Cirillo et al. to maintain sufficient rotational speeds of the brush to allow the centrifugal forces to act as suggested by that disclosure.

What is needed, then, is a device and system that can be used in a variety of circumstances, and under a variety of conditions, to remove dust and other particulate matter from the air.

SUMMARY OF THE INVENTION

The present invention provides a system for removing particles from an air stream includes a housing having an air stream inlet at a first end thereof and an air steam exhaust at a second end thereof. The housing defines a flow path between the air stream inlet and the air stream exhaust. At least one liquid introduction jet disposed between the air stream inlet and the air stream exhaust injects liquid droplets into the air stream. A scrubber disposed between the at least one liquid introduction jets and the air stream exhaust for removes smaller particles from the air stream.

In one aspect of the invention, the scrubber is a dust scrubbing drum that includes a plurality of brushes extending radially from a rotatable attachment sleeve, the brushes accumulating moistened fine particles from the air stream, forming aggregated solids.

In another aspect of the invention, the system include an air stream cleaning chain disposed between the air stream inlet and the at least one liquid introduction jet. The air stream cleaning chain includes a plurality of openings sized to allow the air stream to pass through while collecting a plurality of larger particles transported by the air stream.

In still another aspect of the invention, the system includes a fan disposed between the air stream cleaning chain and the at least one liquid introduction jet, the fan pulling the air stream through the housing.

In another aspect of the invention, the scrubber rotates at a speed insufficient to generate forces necessary to cast of the accumulated fine particles.

BRIEF DESCRIPTION OF THE DRAWINGS

FIG. 25 shows a close up view of another liquid introduction means which might be utilized in an embodiment of the disclosed harvester.

DETAILED DESCRIPTION OF THE INVENTION

Figure 1:
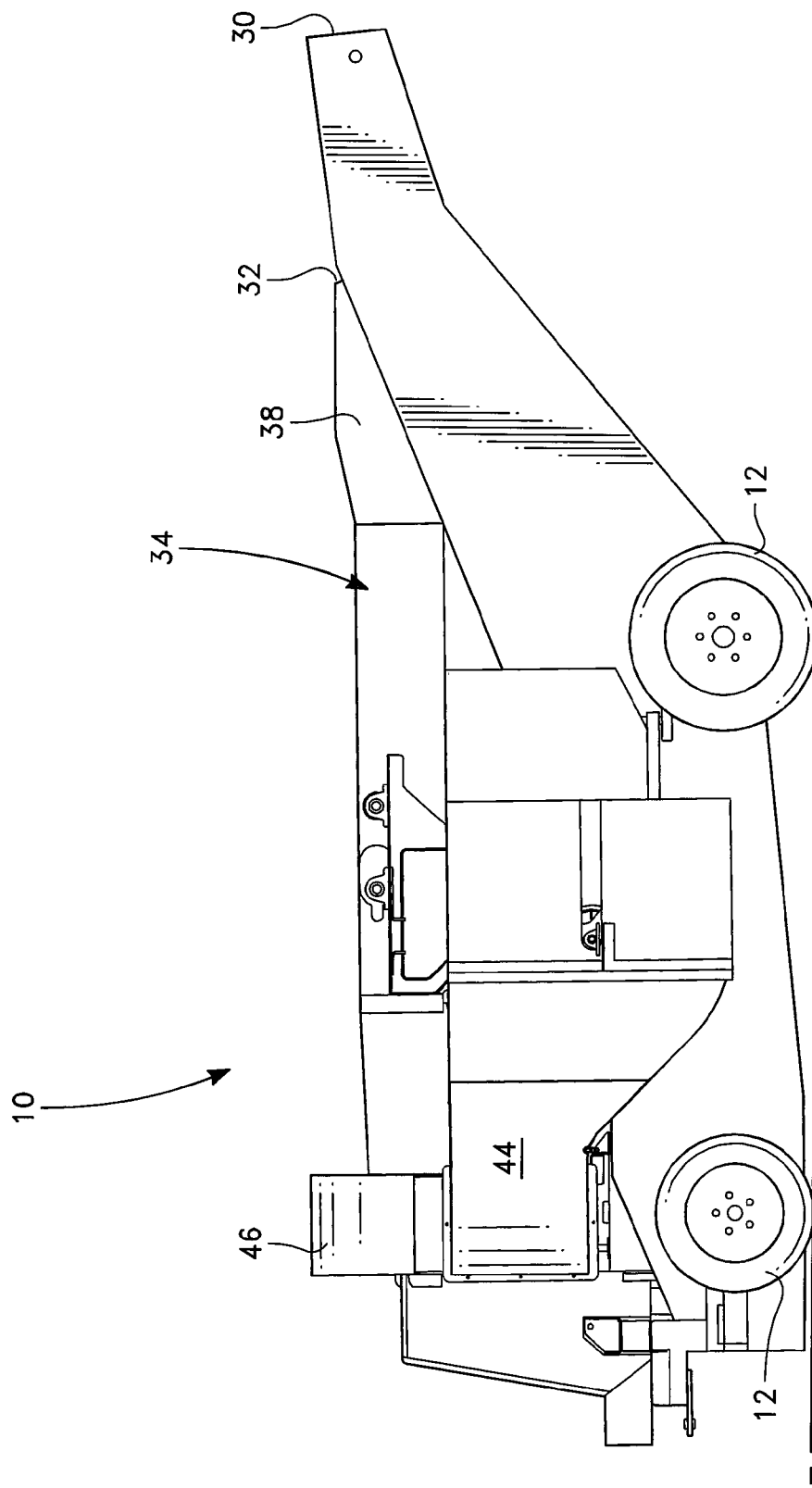
FIG. 1 is a left hand view of a harvester comprising an embodiment of the disclosed dust suppression system.
Figure 2:
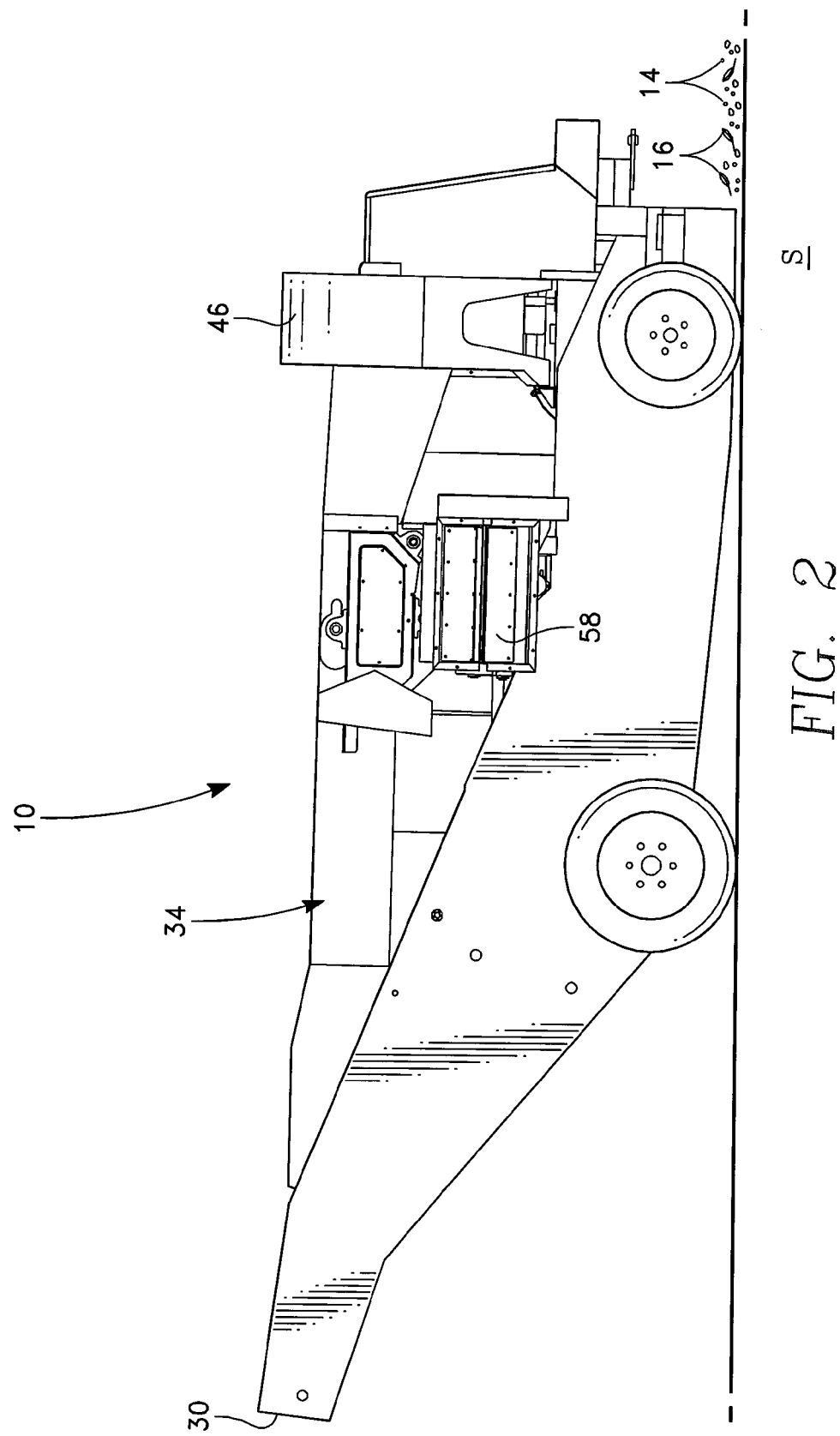
FIG. 2 is a right hand view of a harvester comprising an embodiment of the disclosed dust suppression system.
Figure 3:
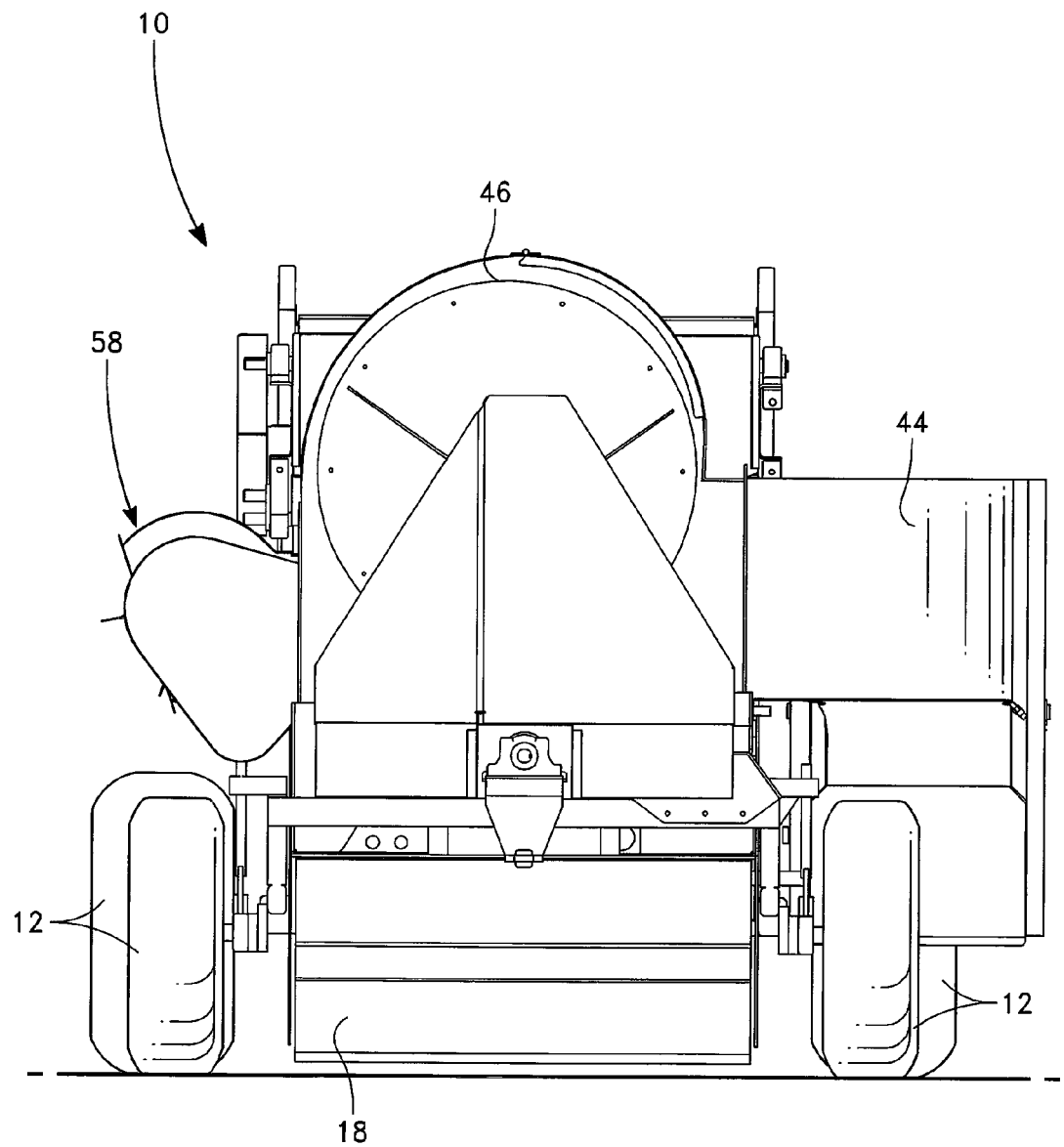
FIG. 3 is a front view of a harvester comprising an embodiment of the disclosed dust suppression system.
Figure 4:
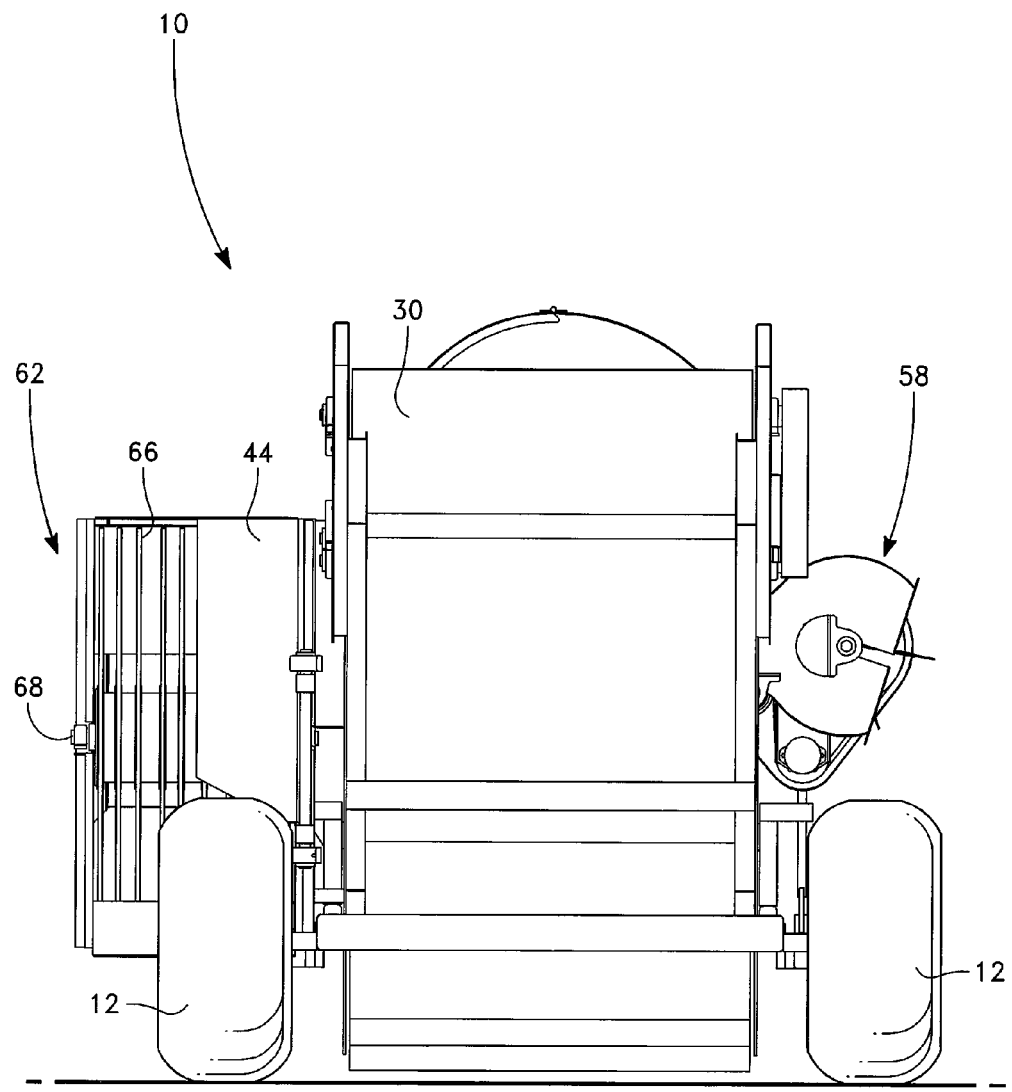
FIG. 4 is a rear view of a harvester comprising an embodiment of the disclosed dust suppression system.
Figure 5:
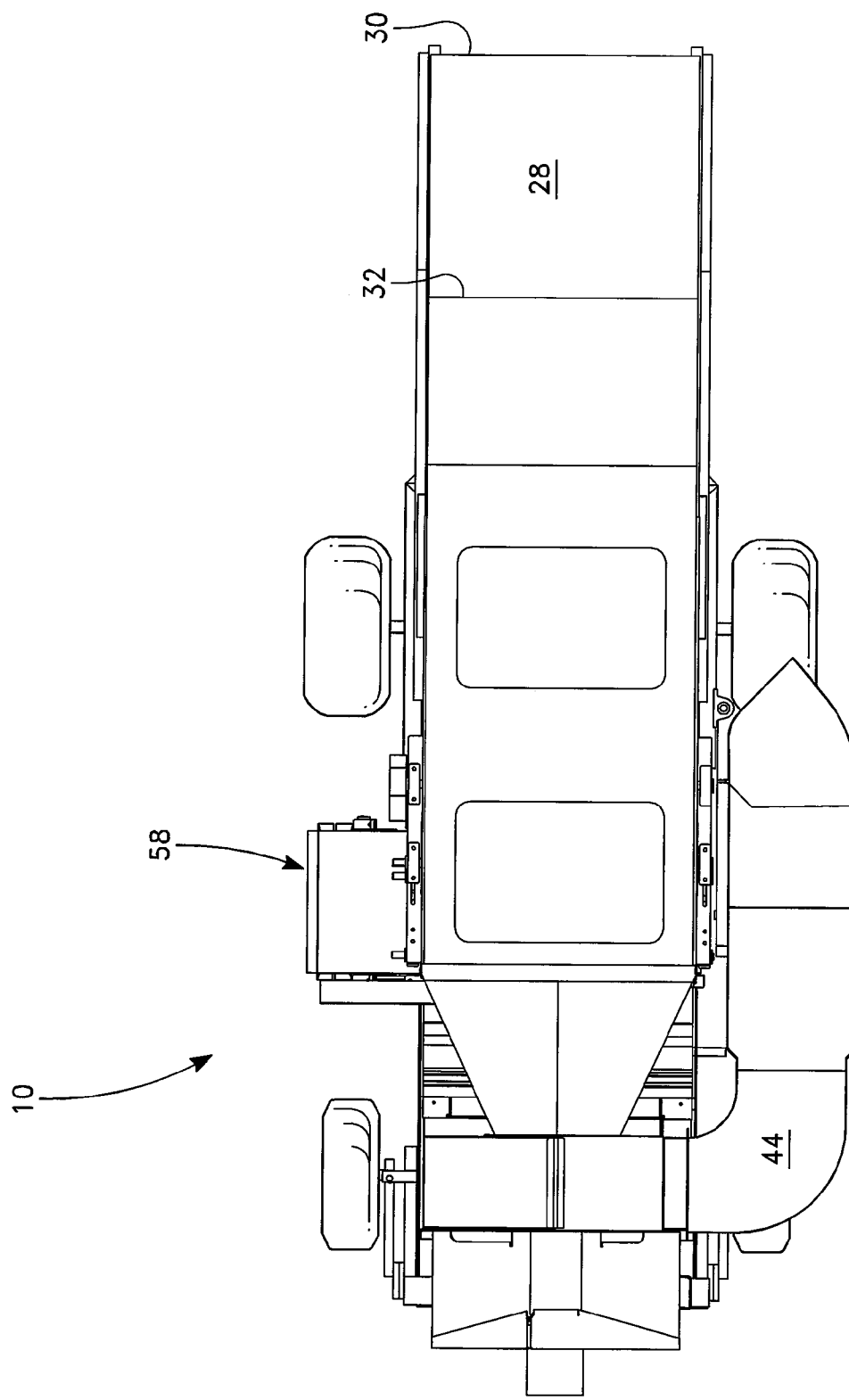
FIG. 5 is a top view of a harvester comprising an embodiment of the disclosed dust suppression system.
Figure 6:
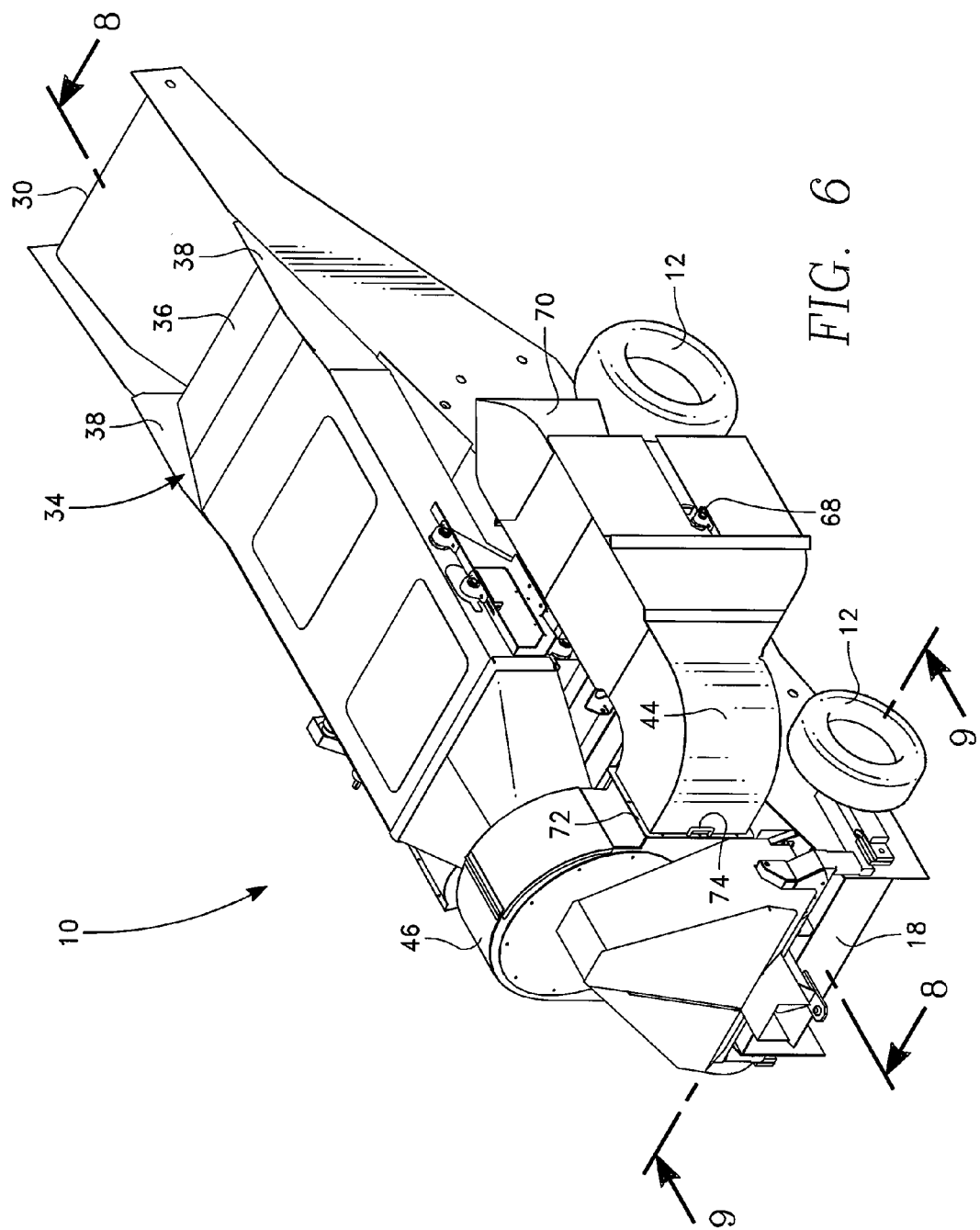
FIG. 6 is an isometric view of the left hand side of a harvester comprising an embodiment of the disclosed dust suppression system.
Figure 7:
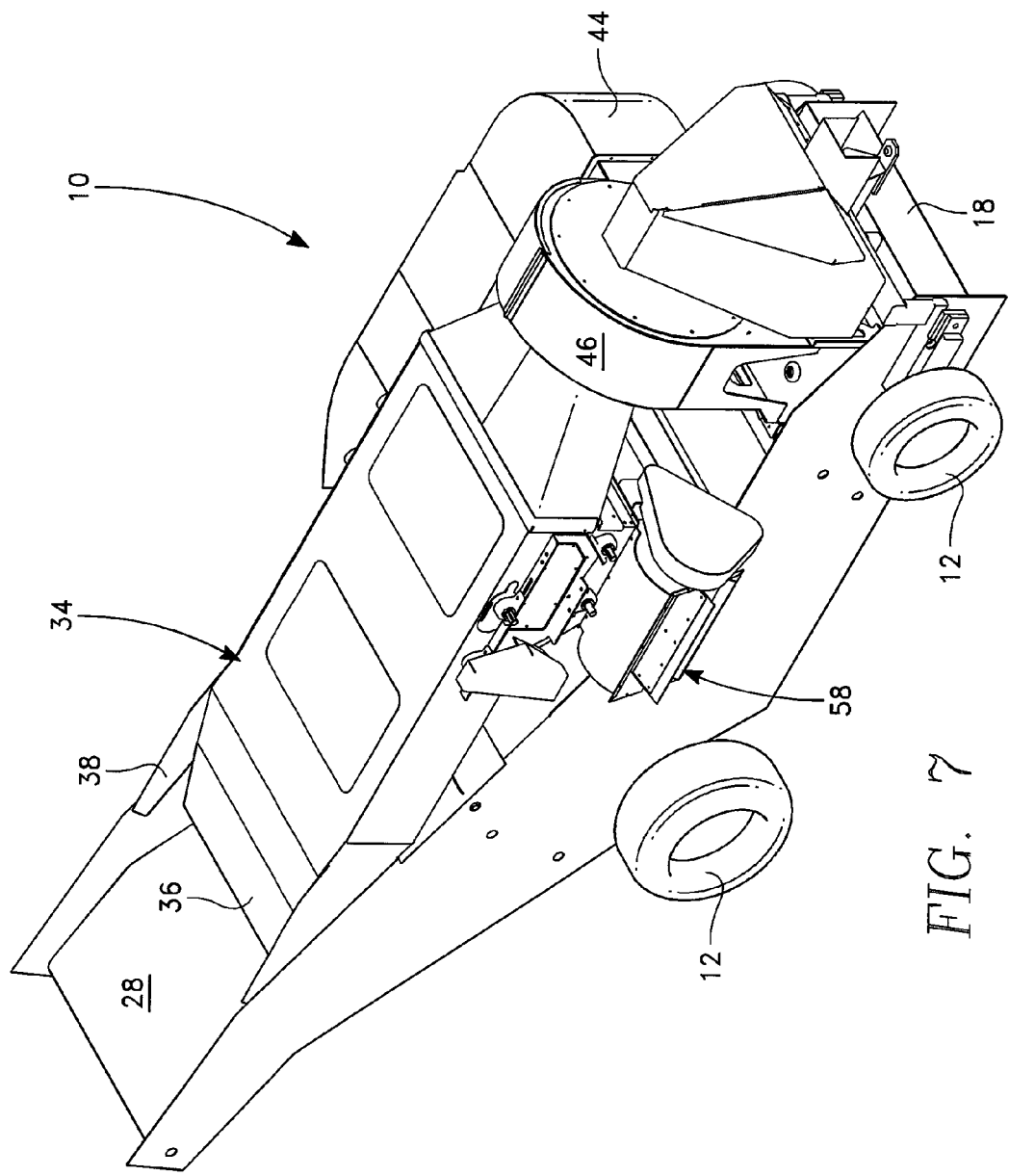
FIG. 7 is an isometric view of the right hand side of a harvester comprising an embodiment of the disclosed dust suppression system.
Figure 8:
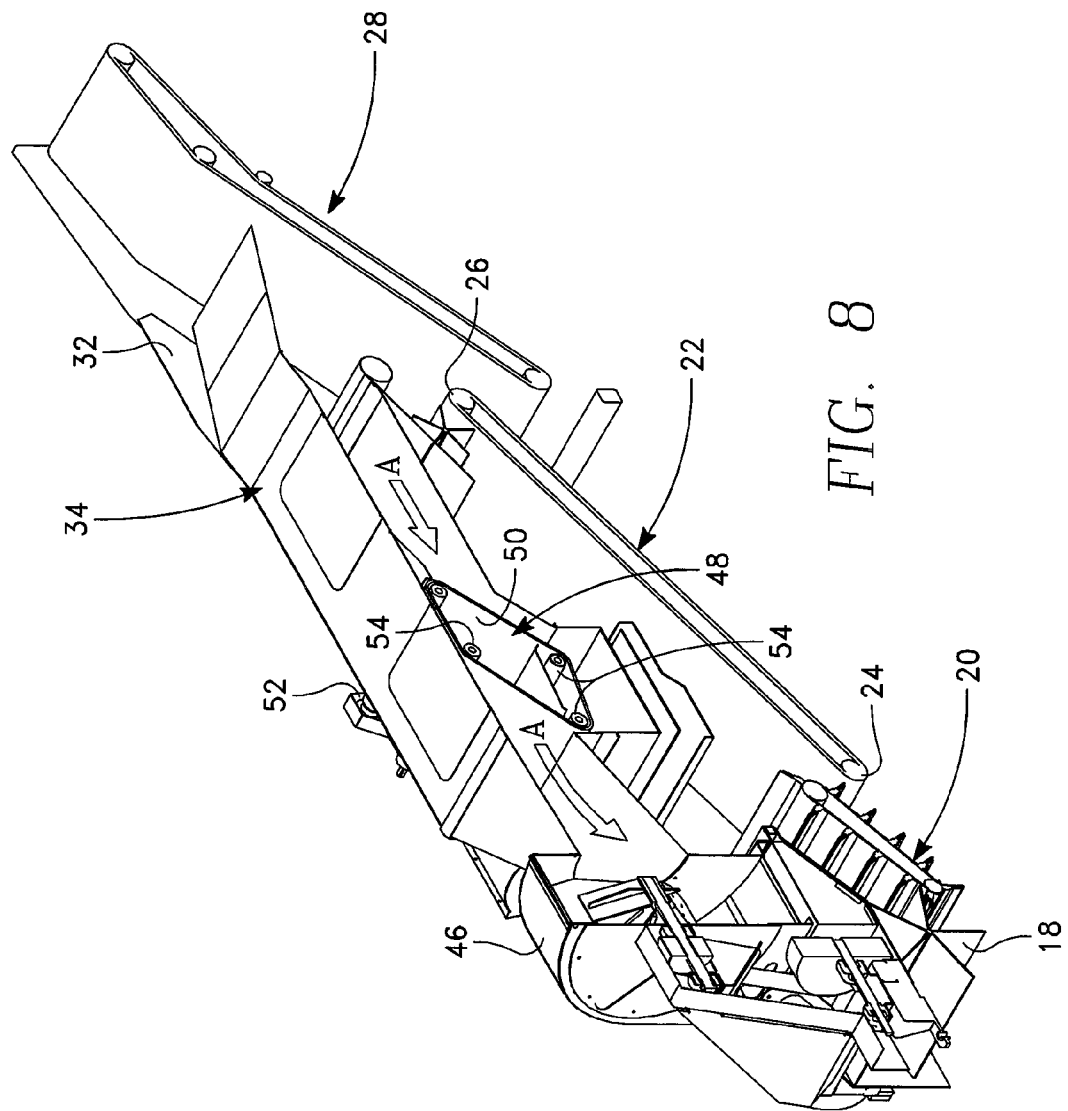
FIG. 8 is a sectional view of a harvester along line 8-8 of FIG. 6.
Figure 9:
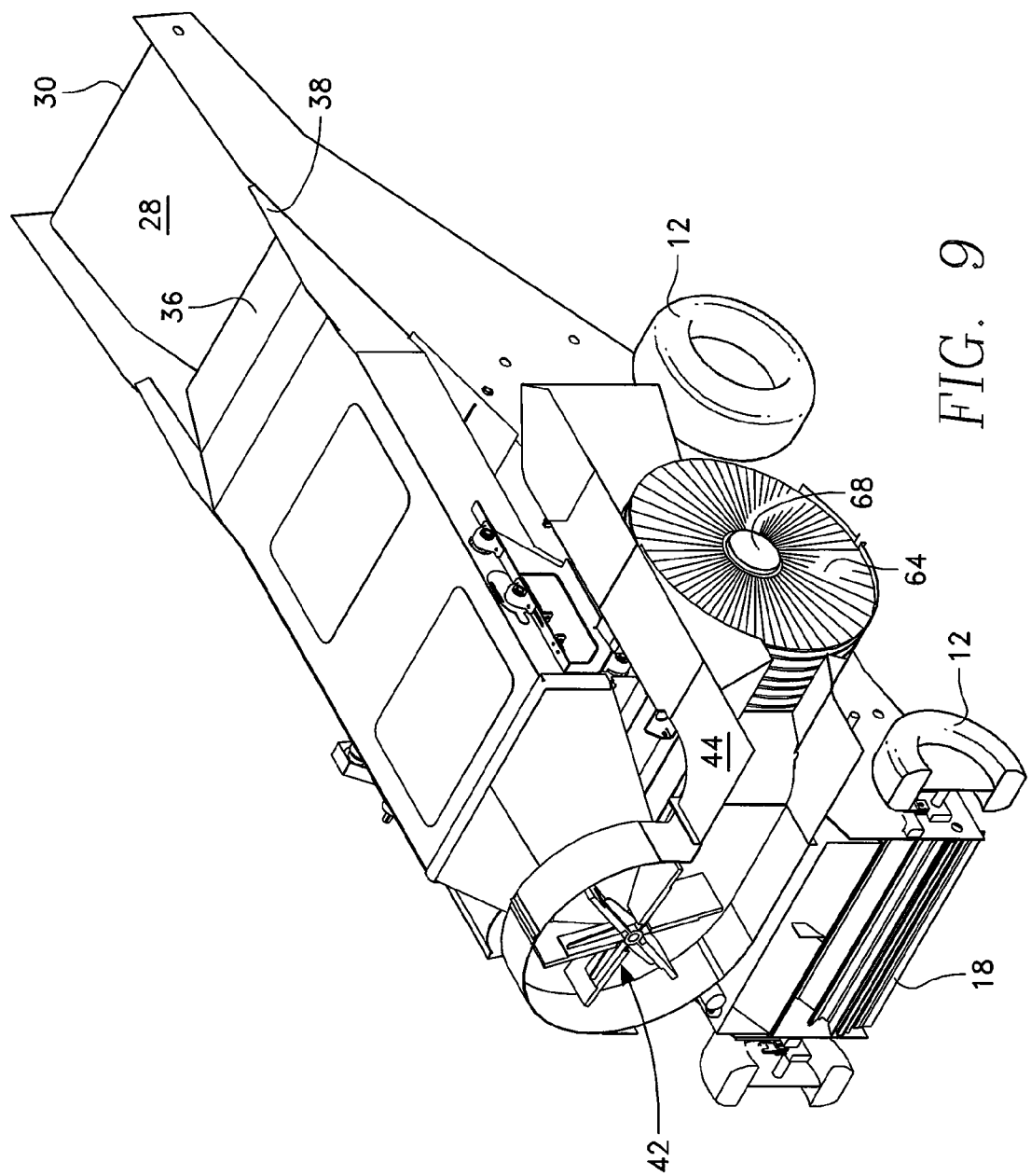
FIG. 9 is a sectional view of a harvester along line 9-9 of FIG. 6, with a portion of the housing removed to show the fan rotor and drum brush.
Figure 10:
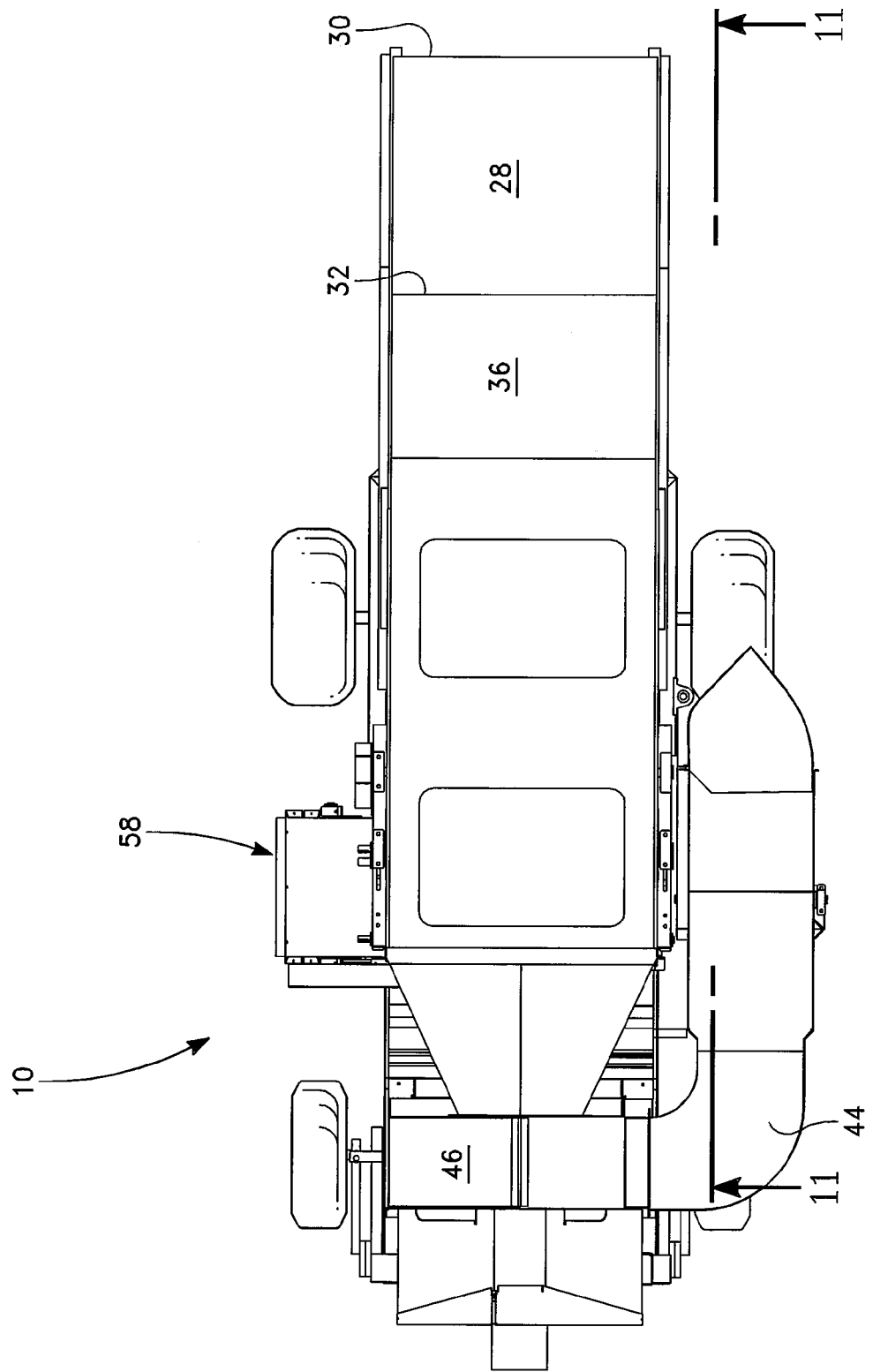
FIG. 10 is a top view of an embodiment of the harvester.
Figure 11:
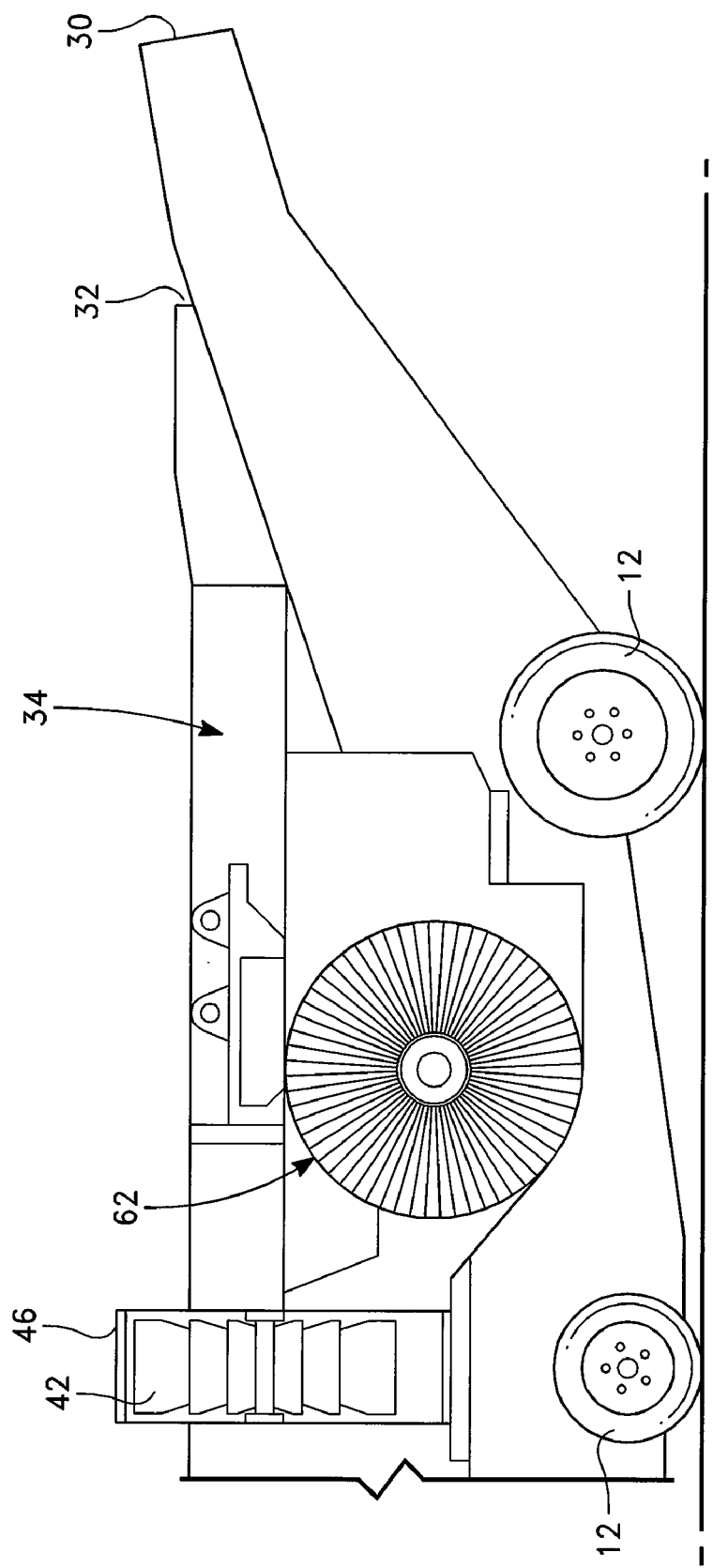
FIG. 11 is a sectional view taken along line 11-11 of FIG. 10.
Figure 12:
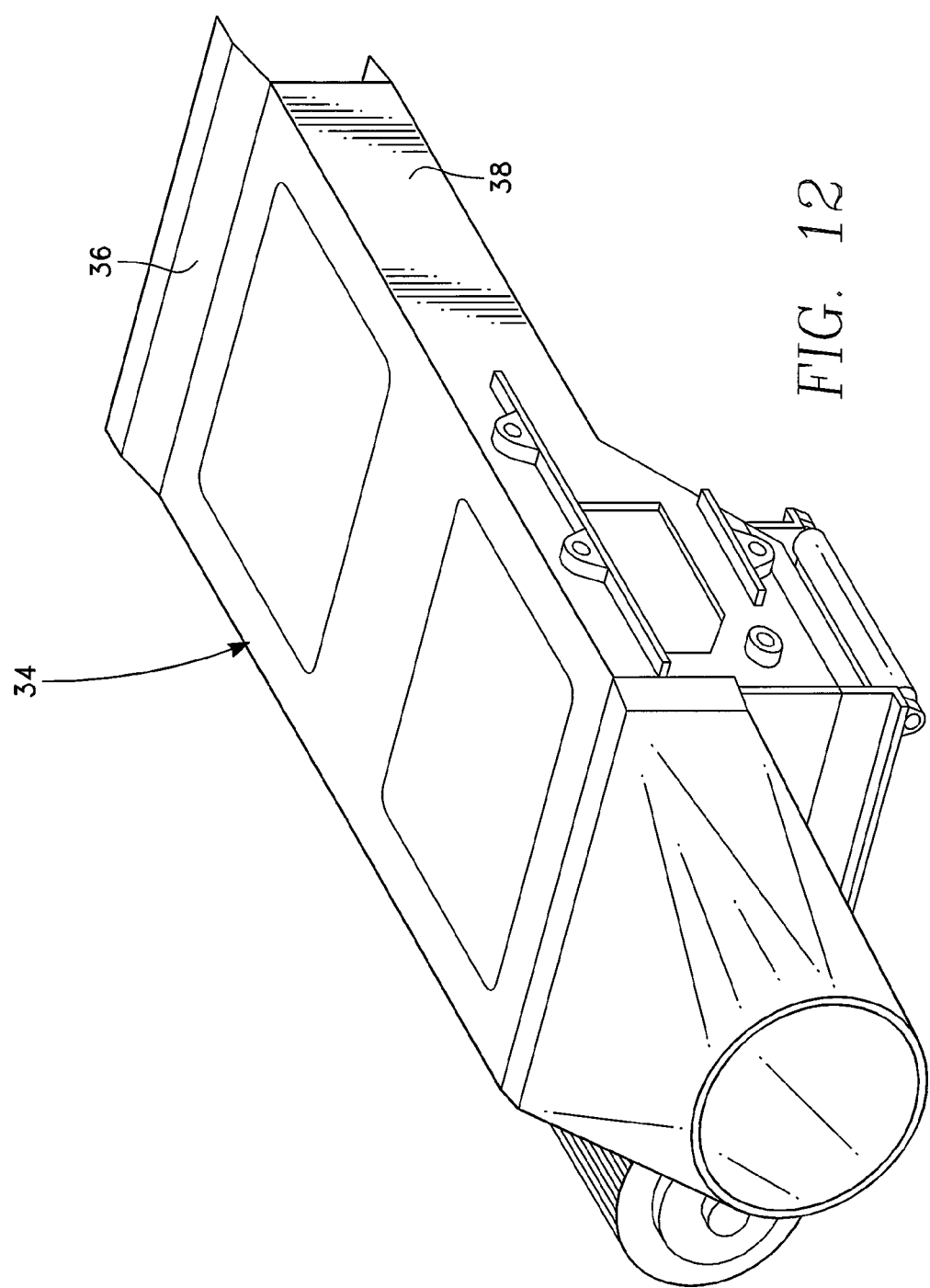
FIG. 12 is a partial isometric showing a portion of the upper housing for an embodiment of the disclosed dust suppression system.
Figure 13:
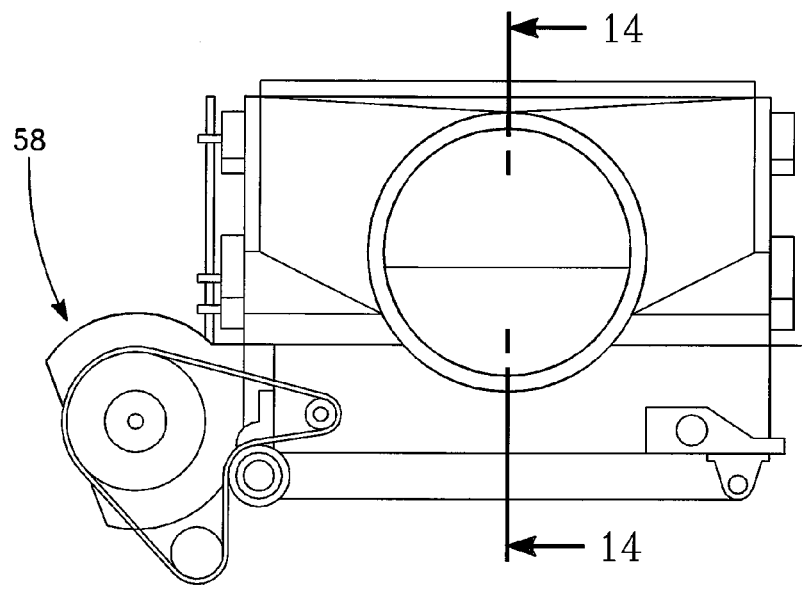
FIG. 13 shows a partial front view of the housing for an embodiment of the harvester.
Figure 14:
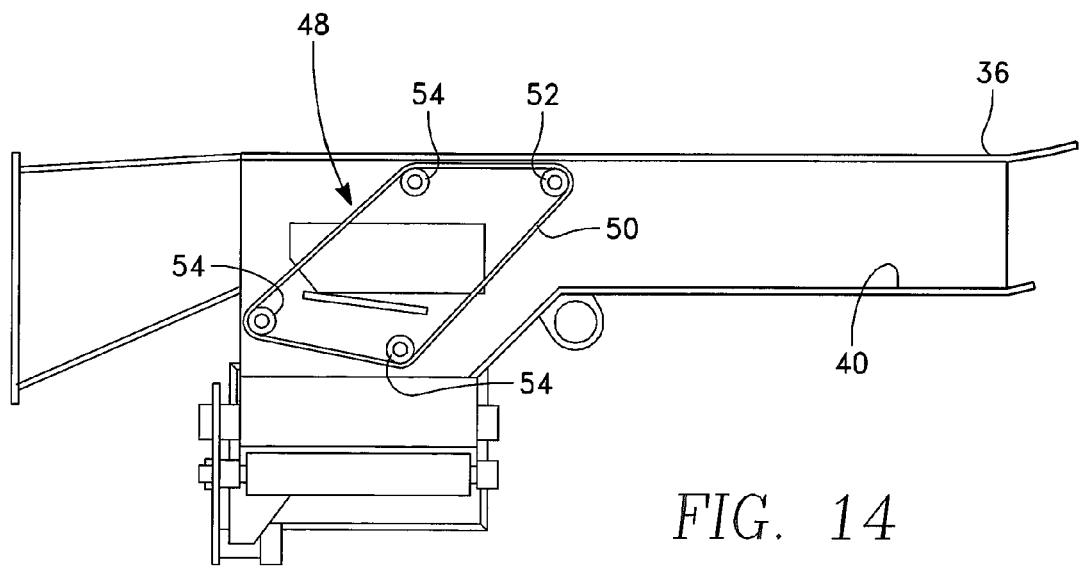
FIG. 14 is a sectional view taken along line 14-14 of FIG. 13.
Figure 15:
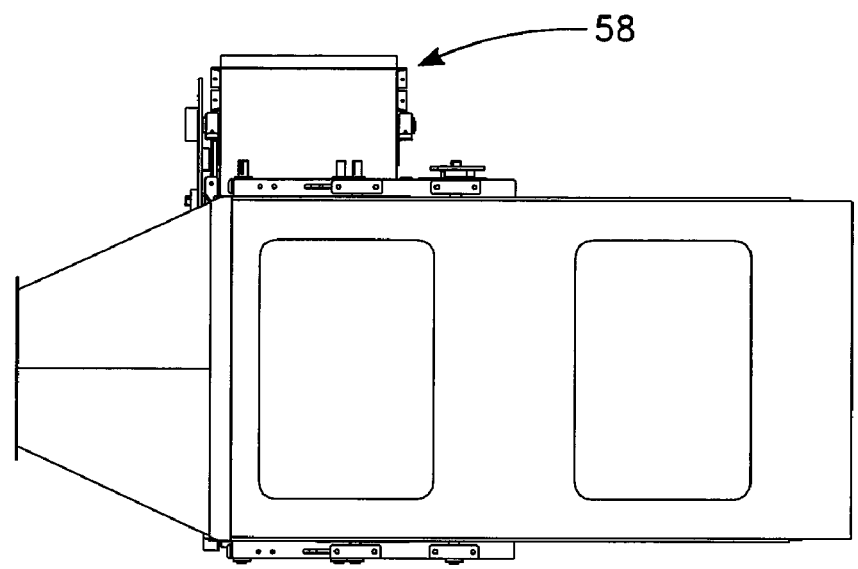
FIG. 15 is a partial top view of the housing for an embodiment of the harvester.
Figure 16:
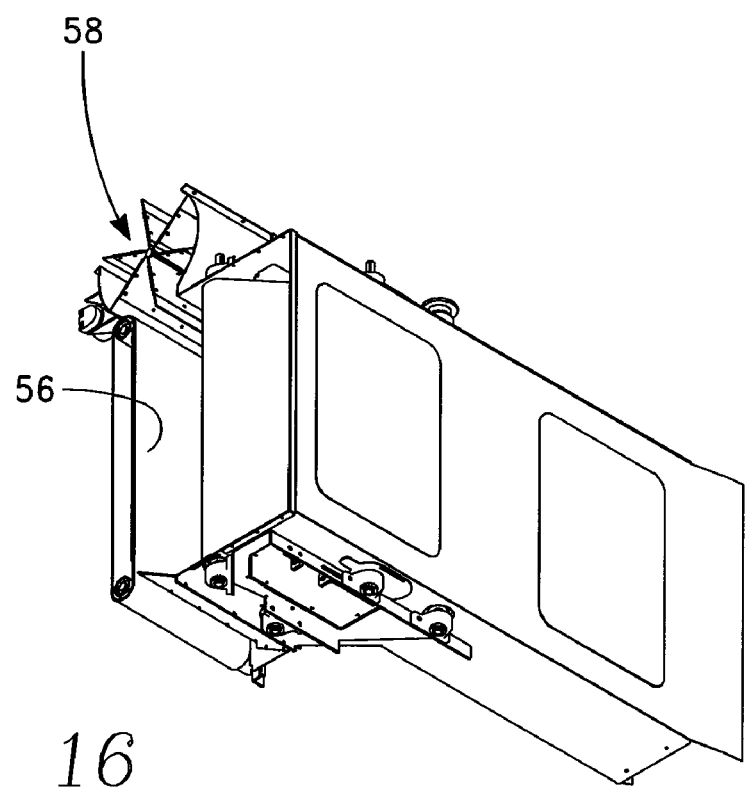
FIG. 16 is a partial isometric view of the housing for an embodiment of the harvester.
Figure 17:
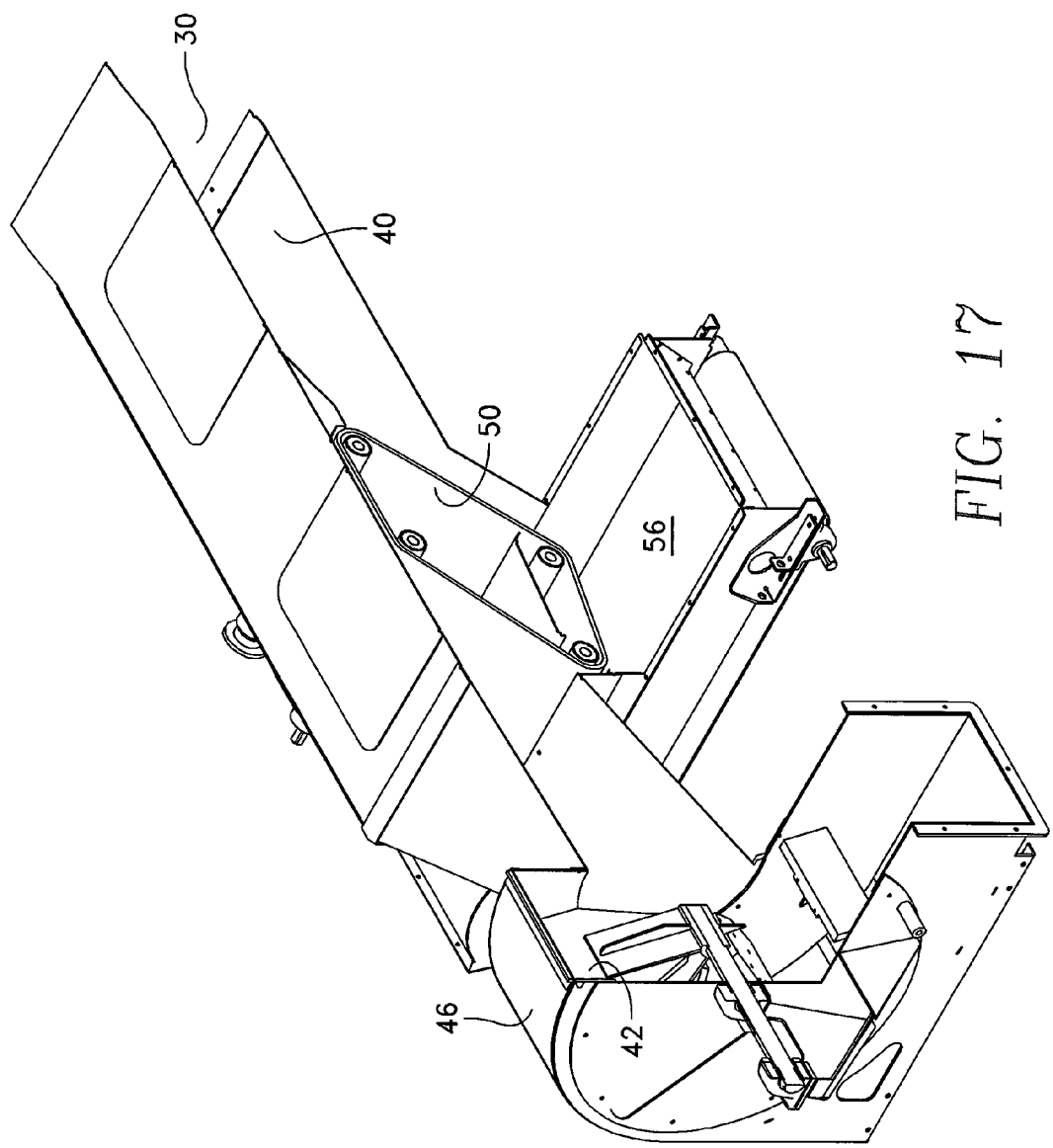
FIG. 17 is a partial sectional view showing, among other things, the relative positions of the air stream cleaning chain and the cross conveyor discharge belt which may be utilized in an embodiment of the disclosed harvester.
Figure 18:
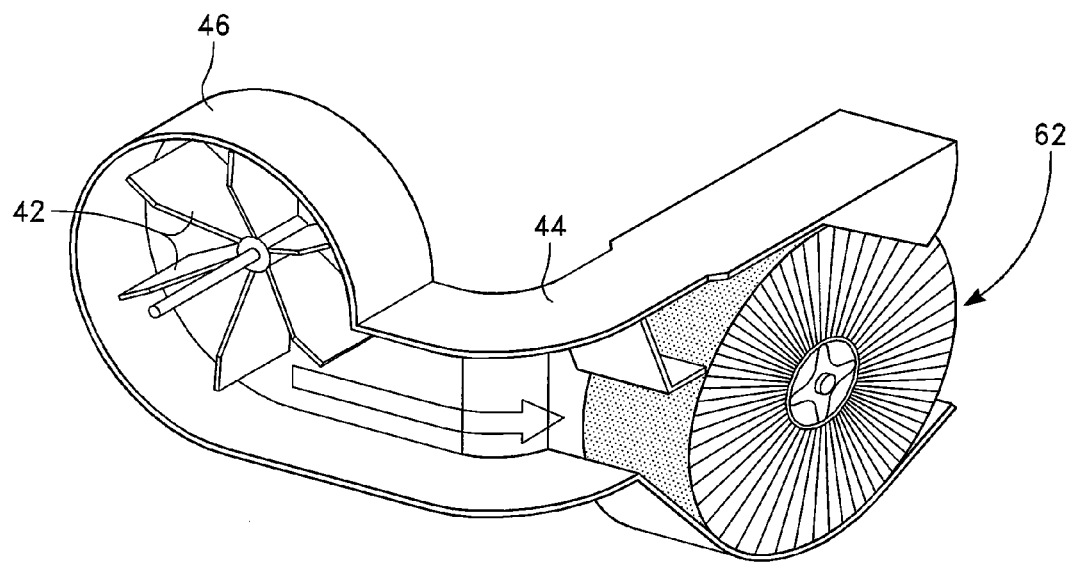
FIG. 18 shows a partial isometric view of a fan-brush combination which may be utilized in an embodiment of the disclosed harvester, showing the flow direction.
Figure 19:
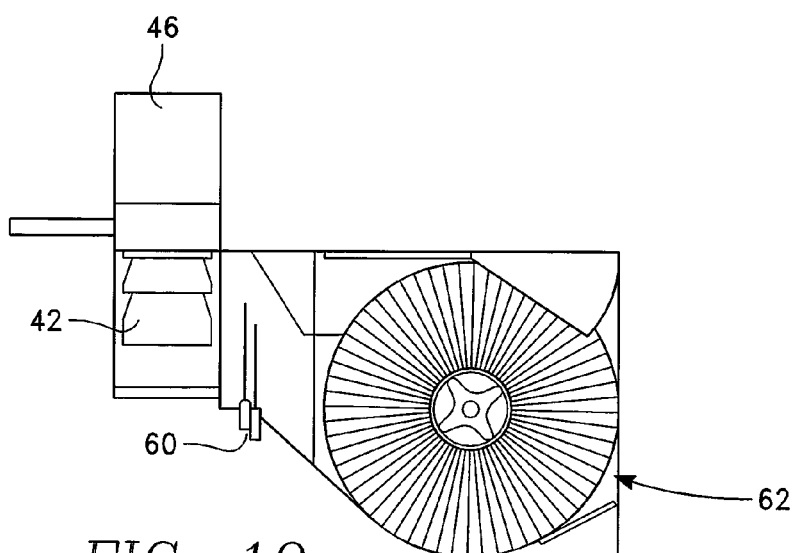
FIG. 19 shows a partial side view of the fan-brush combination shown in FIG. 18.
Figure 20:
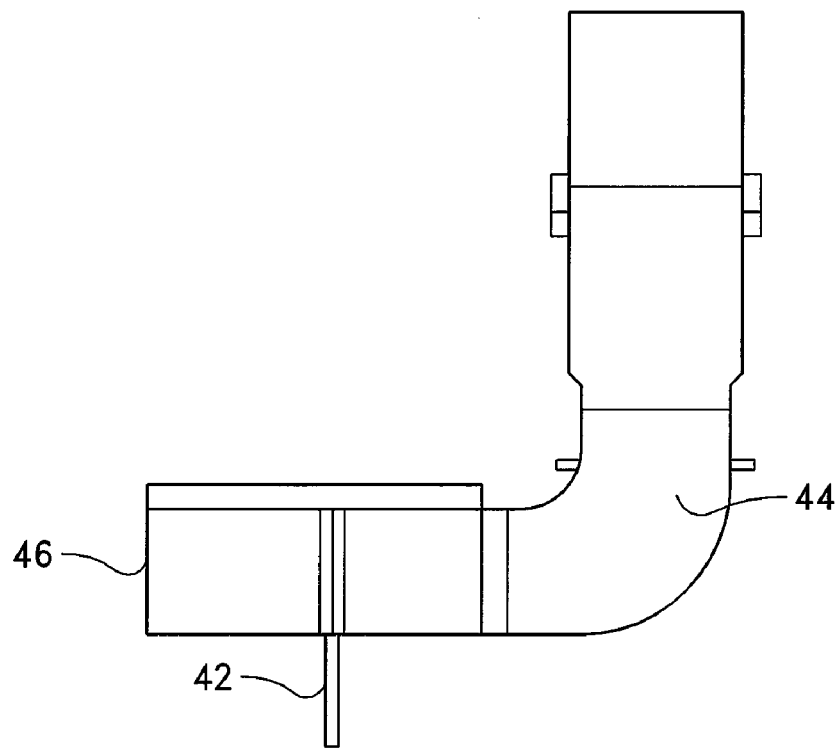
FIG. 20 shows a partial top view of the exterior of the housing for the fan-brush combination shown in FIG. 18.
Figure 21:
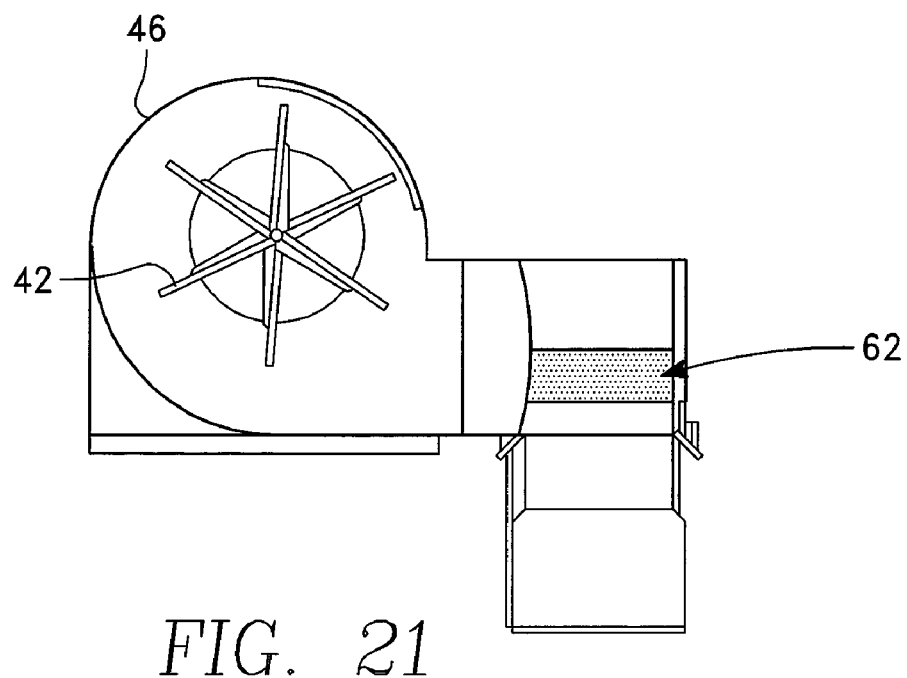
FIG. 21 shows a partial front view of the fan-brush combination shown in FIG. 18, showing an option for placement for liquid spray tips.
Figure 22:
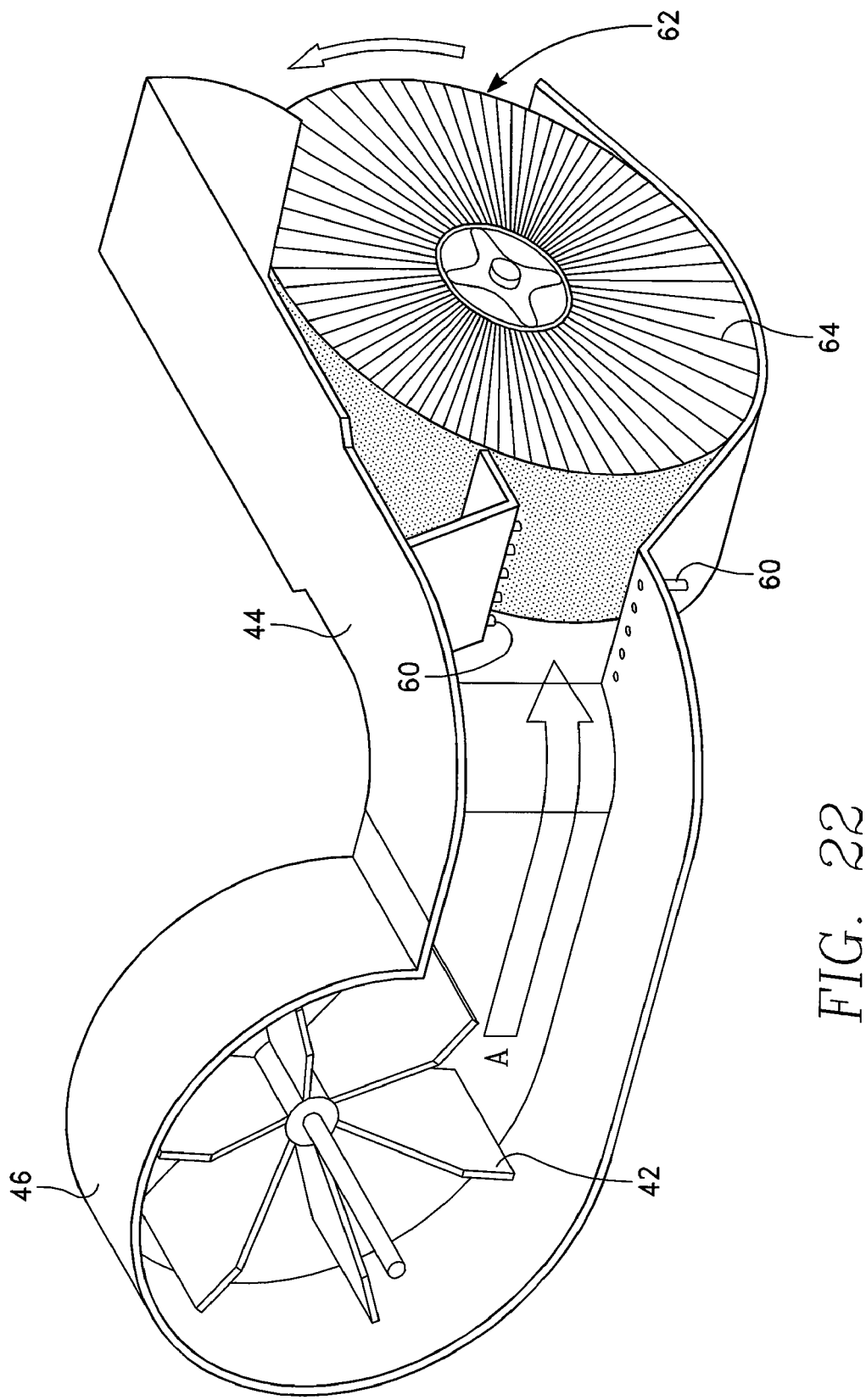
FIG. 22 shows a partial isometric view of a fan brush combination which may be utilized in an embodiment of the disclosed harvester.
Figure 23:
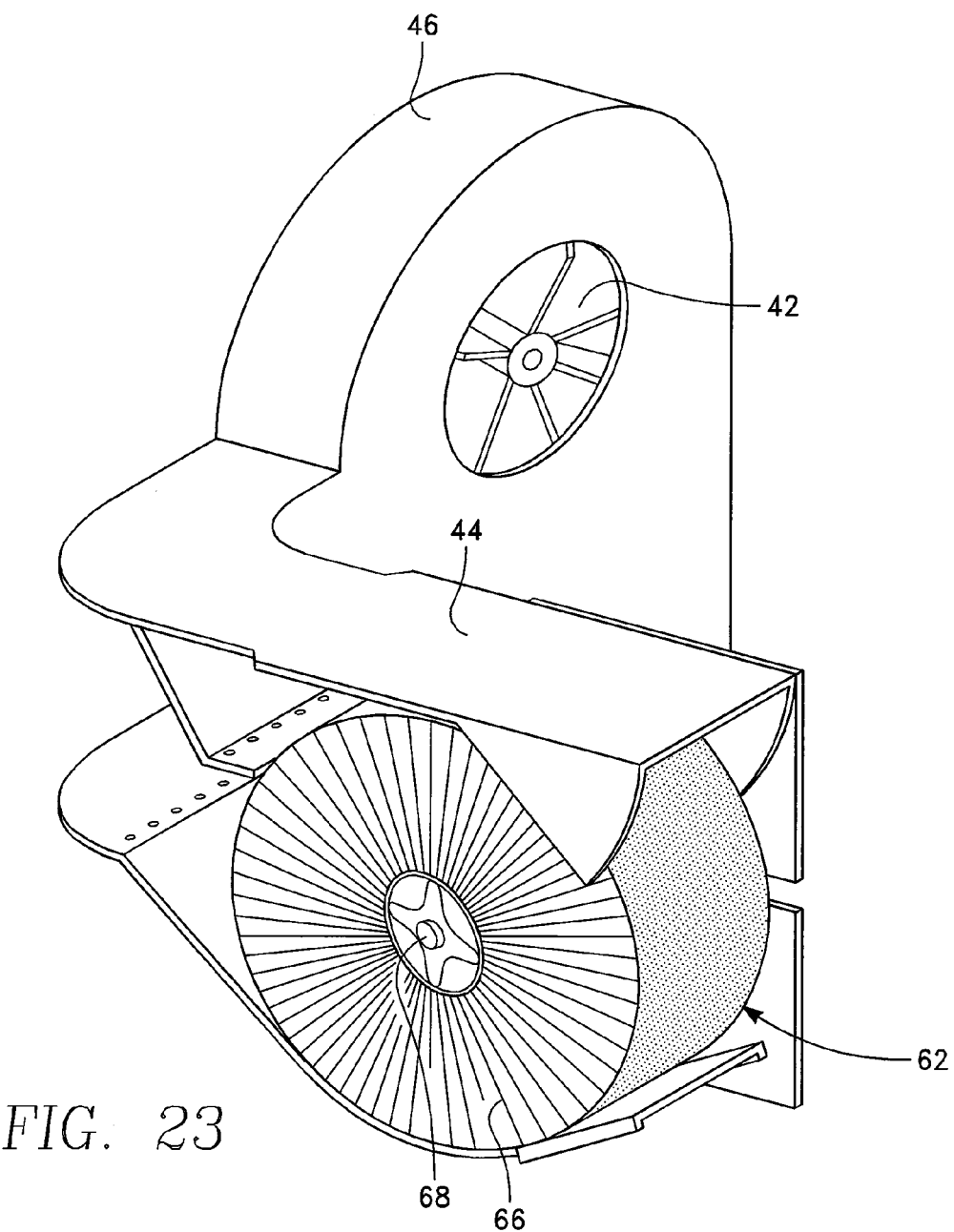
FIG. 23 shows another view of a fan brush combination which may be utilized in an embodiment of the disclosed harvester.
Figure 24:
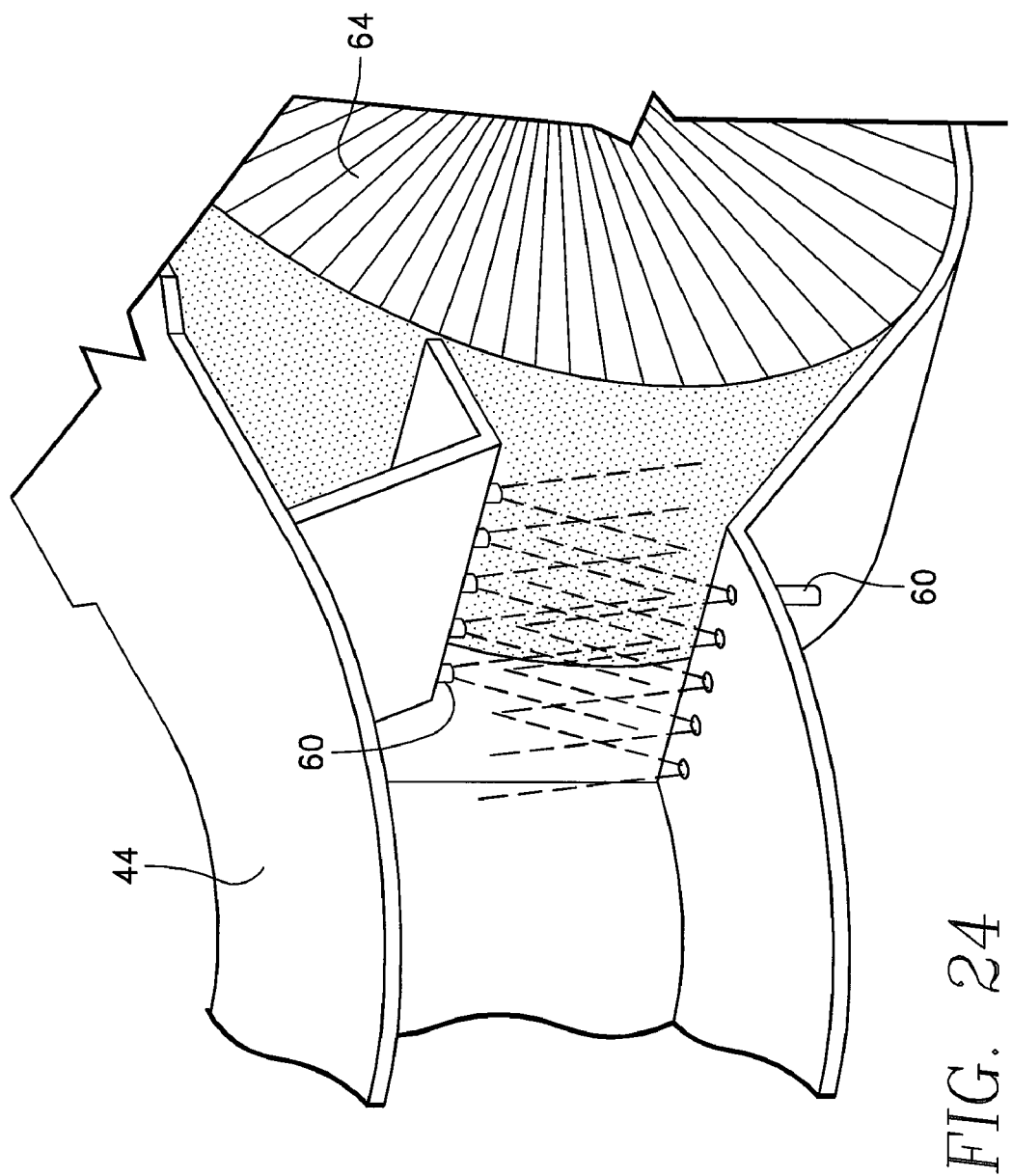
FIG. 24 shows a view of a liquid introduction means which might be utilized in an embodiment of the disclosed harvester.

The present invention provides a device for removing dust and other particulate matter, including larger particulate matter, from an air stream. The Figures provided herewith illustrate one embodiment of the present invention adapted for use with a specific device, namely, a crop harvester. It is to be understood, however, that the present device is not limited to use in a crop harvester, or to the layout or design shown in the Figures, which are exemplary and provided for purposes of clarity. The Figures do, however, show key components of the present invention, including a housing 34 having an opening, or air stream inlet, at a first end 32 and an air stream exhaust 70 at a second end, a fan 42, spray tips 60, and scrubber 62. These components of the present device and system are described in greater details with respect to the harvester embodiment, below. The layout, arrangement, and configuration of the components of the present device and system shown in the Figures is exemplary, and it is contemplated that the various components of the present invention may be provided in any suitable configuration or arrangement.

Generally, an air stream enters housing 34 through first end 32 and passes through the device, at least a portion of the particulate matter in the air stream being removed in the process. The air stream may be pulled or pushed through the housing by one or more fans 42, or may enter the housing in some other manner. As thr air stream moves through housing 34 it passes through a layer or mist of moisture introduced into the housing 34 by spray tips 60. This moisture causes the particles traveling through the air stream to become wet. The wet particles then impact scrubber 62, adhering thereto.

Scrubber 62 may be any suitable structure for capturing the moistened fine particles traveling through an air stream. Scrubber 62 is preferably a rotating drum with a plurality of brushes extending therefrom, the brushes being disposed to capture the fine particles traveling with the air stream. It is contemplated, however, that other surfaces, including a flat-surfaced rotating drum, may be used. Regardless of the specific structure of scrubber 62, it is preferred that scrubber 62 rotate in the direction of the air stream traveling through housing 34. Further, it is preferred that scrubber 62 rotate slow enough that the fine particles adhered thereto are not cast off by centrifugal forces produced by scrubber 62, but instead fall from scrubber 62 at or near a low point thereof by force of gravity on the mass of the accumulated material. This provides an advantage over existing systems where centrifugal forces cast off material in a relatively uniform distribution. The present system allows material to fall from scrubber 62 in a defined area, reducing problems associated with the accumulation of particulate matter on many of the interior surfaces of housing 34. After passing through scrubber 62, the air stream exits the present device via air stream exhaust 70.

In some embodiments of the present system, larger particulate matter may be traveling with an air stream, and in such embodiments it may be necessary or desirable to remove the large particulates prior to the air stream reaching scrubber 62. In such embodiments, and air stream cleaning chain 50 may be utilized. Air stream cleaning chain 50 is described in greater detail below with respect to the Example.

For purposes of illustration and clarity, an embodiment of the present system is now described in conjunction with a mobile harvester device adapted for use therewith.

Example

Harvester

Now with reference to the figures, FIG. 1 shows an embodiment of a harvesting unit 10 which may comprise an embodiment of a dust suppression system disclosed herein. This type of harvesting unit 10 is mobile, having ground conveyance means such as wheels 12, but it might also comprise tracks, rollers, and the like. Further, the present system may be provided in a stationary device use in harvesting or separating agricultural products from dirt, rocks, and other debris. Harvesting unit 10 gathers harvested crops, such as nuts, fruits and the like, from the ground surface, where the crops will typically have been deposited from the shaking of trees or other harvesting method. The crops are typically deposited in a spread out configuration, forming a carpet on the ground surface. This type of harvesting unit 10 is well suited for the processing of almonds, but could also be utilized in the gathering of a variety of other crops lying on a ground surface after having been removed from a tree. In addition to almonds, the harvested crop may be another variety of nut, such as cashews, chestnuts, hazelnuts, macadamia nuts, pecans, walnuts and tung nuts. Certain fruits, such as figs and oranges, and any fruit, nut or vegetable, as conventionally known to require collection and processing from the ground, may also be gathered with this type of harvester, and this embodiment of the present dust suppression system employed. It is to be appreciated that while the Figures herein show a harvester 10 which is equipped to be towed by a tractor or other towing vehicle, the present dust suppression system may equally be utilized with a self-propelled harvesting unit. The various conveyors, chains, drive wheels, and the like of the harvester will be driven by the means known in the art, typically by hydraulic motors.

The type of harvesting unit 10 described for purposes of this example generally comprises a collection means for collecting the agricultural products, such as crops 14, from the ground surface S. Because the crops 14 are blanketed across the ground dispersed among other foreign matter 16, such as leaves, twigs, dirt, gravel, dirt clods, and the like, the collection means will gather a combination of all of these materials into the harvesting unit. The foreign matter 16 will typically comprise a mixture of larger and smaller particles, and some foreign matter will comprise dirt or other relatively fine grained particles. The collection means may comprise brushes, conveyors, or a sweeping array as disclosed in U.S. Pat. Nos. 7,131,254 and 7,412,817 which were invented by some of the inventors herein and which are incorporated herein in their entireties by this reference. One embodiment of the collection means may comprise a rotating sweeper 18 and/or pickup belt 20 which gather the agricultural products and foreign matter from the ground S. The collection means directs all of the gathered materials onto a primary chain 22. The primary chain 22 has a receiving end 24 which receives the crops and foreign matter which have been collected by the collection means. At the end opposite the receiving end 24, the primary chain comprises a delivery end 26 to which substantially all of the crops and foreign matter are delivered. However, it is to be appreciated that the primary chain 22, and the other chains of most harvesters, are typically linked chain with openings, such that smaller foreign matter and perhaps smaller crops will fall through back onto the ground surface S. Therefore, while a substantial amount of the crops and foreign matter will reach the receiving end 24, some of the crops and foreign matter may have fallen through the openings in the primary chain 22.

The harvesting unit 10 further comprises an elevator chain 28. The elevator chain 28 receives crops and foreign matter from primary chain 22. The crops are carried up elevator chain 28 and discharged through discharge chute 30 to a storage container, the ground, or other repository for the crops. Adjacent to elevator chain 28 is the end 32 of a ductwork or housing 34 which may be oriented along the lengthwise axis of the harvesting unit 10. An opening is defined at the end 32 of the housing by the top 36, side pieces 38, and bottom 40. A fan 42 is disposed within housing 34 within its own fan housing 46. Fan 42 generates an air stream A by pulling air from the opening at the end 32 of the housing 34 and discharging the air into discharge duct 44 on the opposite site of the fan 42. The air stream A flows through housing 34, with the direction of the air stream generally moving from the elevator chain 28 toward the fan 42. The fan 42 may thus be considered to have a suction side which is oriented toward end 32 and at least a portion of elevator chain 28 and a discharge side which begins on the opposite side of the fan, with the generated air stream discharging into air stream discharge duct 44. As suction is pulled by the air stream A through the openings in elevator chain 28, and through the crops and foreign matter being transported on the elevator chain, the lighter foreign matter is carried in the air stream toward fan 42 through housing 34.

Disposed between fan 42 and elevator chain 28 is an air stream cleaning chain assembly 48. The air stream cleaning chain assembly 48 comprises the primary separation methodology for removing foreign material from the air stream before much of the foreign material is passed through the fan 42 and discharged into the atmosphere. The air stream cleaning chain assembly 48 may comprise air stream cleaning chain 50, drive roller 52 and idler rollers 54. As air stream cleaning chain 50 is rotated about the idler rollers 54, a portion of the air stream cleaning chain is continually positioned to be normal to the general direction of the air stream A. Air stream cleaning chain 50 allows the air stream to pass through it, but stops the larger particles of foreign material, such as leaves, grass, etc., because the air stream cleaning chain comprises a plurality of closely spaced links, wherein the openings between the links are relatively small. Air stream cleaning chain 50 may have a width of approximately four feet.

Foreign material which is stopped by the air stream cleaning chain 50 is discharged from the harvesting unit 10 by discharging means which transport the larger particles of the foreign matter collected on the air stream cleaning chain to the exterior of the harvesting unit. The discharging means may comprise a cross conveyor discharge belt 56 which is disposed below the air stream cleaning chain 50. Foreign material accumulated on the air stream cleaning chain is deposited onto the cross conveyor discharge belt 56, which transports the larger particles of the foreign material to a disposal duct through an air lock assembly 58.

The finer particles of foreign material will be carried through the openings in air stream cleaning chain 50 and transported through housing 34 by air stream A through fan 42 and into air stream discharge duct 44, which is on the discharge side of the fan. The air stream discharge duct 44 comprises a further mechanism for removing particulates from the air exhaust of the harvester 10, which is utilized to remove smaller particles which passed through the air stream cleaning chain 50. This mechanism employs injecting water or other appropriate liquid into the air stream A as it enters the air stream discharge duct 44. As shown in FIGS. 18 through 25, the air stream discharge duct 44 comprises liquid introduction means such as a plurality of spray tips 60, or other liquid introduction means, such as directional jets 160 shown on 25. Directional jets 160 may be set within the inside wall of air stream discharge duct 44 and may be installed and directed to provide a curtain of liquid spray through which the air stream A, with its entrained dust particles, passes. Other liquid introduction means may be utilized. For example, spray tips comprising a variety in number and tip size may be used for this purpose. As another embodiment, the system may utilize multiple manifolds of spray tips to offer various options for the introduction of the liquid into the dust infused air stream. The harvester 10 may comprise liquid storage tanks for storing the liquid utilized for the liquid sprayed into the air stream discharge duct 44, and the related pumps and conduits required for the liquid injection process. Alternatively, the storage tanks and pumps may be carried on a separate apparatus.

The air stream discharge duct 44 may comprise additional means for suppressing the fine dust particles transported in the air stream A. The air stream discharge duct may further comprise a scrubber 62. Scrubber 62 may comprise a rotating wafer brush drum 64. The wafer brush drum consists of multiple wafer brushes 66 mounted on a brush attachment sleeve 68, or other collection members which radially extend from the brush attachment sleeve. The wafer brush drum 64 may be rotated in a concurrent direction with the flow of air stream A so as not to cause undue back pressure on the air system. Because of the liquid introduction means discussed above, the air stream A reaching the wafer brush drum is moistened. As the moistened air stream A flows through the wafer brushes, small pieces of moist dirt are scrubbed from the air stream, accumulating on the collection members such that the air being discharged through air exhaust 70 has been substantially cleaned of particulate matter.

Air stream discharge duct 44 connects to fan housing 46 at flange 72. Portions of air stream discharge duct 44 may be easily removable to gain access to the various components of the scrubber 62 and the liquid introduction means contained therein. For example, flange 72 may be held together with a quick-release mechanism 74 and air stream discharge duct 44 may be hinge connected at the flange to allow the air stream discharge duct to pivot outwardly so there is easy access to the internal components.

As noted above, the various components of the present system may be provided in any suitable arrangement or configuration, as necessary or desired given the specific use of the system under a variety of circumstances. Fan 42, for example, may be present near the air stream inlet, in effect pushing the air stream through housing 34, or may be located near the air stream exhaust 70, pulling the air stream through housing 34. In some embodiments of the invention, fan 42 may be located at a point between the inlet and the exhaust, such as between the air stream cleaning chain and the at least one spray tip. In some embodiments of the present system, multiple fans 42 may be provided along the length of housing 34 as necessary to adequately move the air stream therethrough.

The present system is not limited by specific dimensions of housing 34, the air stream inlet or air stream exhaust 70, or scrubber 62. As noted above, any suitable scrubber 62 may be used that accumulates moistened particles thereon and then allows the accumulated matter to drop off of the scrubber by force of gravity on the mass of accumulated matter. Further, the relative dimensions of the scrubber in relation to the housing are not limited by what is described herein or shown in the drawings. The scrubber 62 should, however, be sized and shaped such that most of the air stream traveling through housing 34 impacts scrubber 62, thereby allowing fine particles traveling therewith to be accumulated on scrubber 62. It is contemplated that many modifications to the present device and system will be readily apparent to those of skill in the art upon reading this disclosure.

Having thus described the preferred embodiment of the invention, what is claimed as new and desired to be protected by Letters Patent includes the following:

1. A system for removing particles from an air stream having small particles carried therewith, the system comprising:
    a housing having an air stream inlet at a first end thereof and an air stream exhaust at a second end thereof, the housing defining a flow path between the air stream inlet and the air stream exhaust;
    at least one liquid introduction jet for injecting liquid droplets into the air stream, the at least one liquid introduction jet disposed between the air stream inlet and the air stream exhaust; and
    a scrubber disposed between the at least one liquid introduction jets and the air stream exhaust for removing smaller particles from the air stream,
wherein the small particles accumulate on the scrubber and, subsequently, fall therefrom by force of gravity when the mass of accumulated particles is sufficient to cause the accumulated particles to fall.

2. The system according to claim 1 wherein the scrubber is a dust scrubbing drum comprising a plurality of brushes radially extending from a rotatable attachment sleeve, the brushes accumulating moistened fine particles from the air stream, forming aggregated solids.

3. The system according to claim 1 further comprising an air stream cleaning chain disposed between the air stream inlet and the at least one liquid introduction jet, the air stream cleaning chain comprising a plurality of openings sized to allow the air stream to pass through while collecting a plurality of larger particles transported by the air stream.

4. The system according to claim 3 further comprising a fan disposed between the air stream cleaning chain and the at least one liquid introduction jet, the fan pulling the air stream through the housing.

5. The system according to claim 1 wherein the scrubber rotates at a speed insufficient to generate centrifugal forces necessary to cast off the accumulated fine particles.

6. A system for removing particles from an air stream having small particles carried therewith, the system comprising:
    a housing having an air stream inlet at a first end thereof and an air stream exhaust at a second end thereof, the housing defining a flow path between the air stream inlet and the air stream exhaust;
    at least one liquid introduction jet for injecting liquid droplets into the air stream, the at least one liquid introduction jet disposed between the air stream inlet and the air stream exhaust; and
    a scrubber disposed between the at least one liquid introduction jets and the air stream exhaust for removing smaller particles from the air stream, the scrubber comprising a plurality of brushes radially extending from a rotatable attachment sleeve, the brushes accumulating moistened dust particles from the air stream, forming aggregated solids;
wherein the small particles accumulate on the scrubber and, subsequently, fall therefrom by force of gravity when the mass of accumulated particles is sufficient to cause the accumulated particles to fall,
and further wherein the scrubber rotates at a speed insufficient to generate centrifugal forces necessary to cast off the accumulated fine particles.

7. The system according to claim 6 further comprising an air stream cleaning chain disposed between the air stream inlet and the at least one liquid introduction jet, the air stream cleaning chain comprising a plurality of openings sized to allow the air stream to pass through while collecting a plurality of larger particles transported by the air stream.

* * * * *